US009085648B2

(12) United States Patent
Fricker et al.

(10) Patent No.: US 9,085,648 B2
(45) Date of Patent: *Jul. 21, 2015

(54) SUPERABSORBENT POLYMER PROCESS

(71) Applicant: Evonik Degussa GmbH, Essen (DE)

(72) Inventors: Daniel Fricker, Roeschwoog (FR); Herbert Gartner, Baden-Baden (DE); Marc Hager, Haguenau (FR); Jorg Harren, Krefeld (DE); Hans-Peter Kohler, Buhlertal (DE); Harald Plochinger, Buhl (DE)

(73) Assignee: Evonik Degussa GmbH, Essen (DE)

( * ) Notice: Subject to any disclaimer, the term of this patent is extended or adjusted under 35 U.S.C. 154(b) by 73 days.

This patent is subject to a terminal disclaimer.

(21) Appl. No.: 14/136,934

(22) Filed: Dec. 20, 2013

(65) Prior Publication Data

US 2014/0121322 A1    May 1, 2014

Related U.S. Application Data

(63) Continuation of application No. 13/561,214, filed on Jul. 30, 2012, now Pat. No. 8,653,210, which is a continuation of application No. 12/575,071, filed on Oct. 7, 2009, now Pat. No. 8,357,766.

(60) Provisional application No. 61/103,670, filed on Oct. 8, 2008.

(51) Int. Cl.
*C08F 2/14* (2006.01)
*C08F 2/16* (2006.01)

(52) U.S. Cl.
CPC .... *C08F 2/14* (2013.01); *C08F 2/16* (2013.01)

(58) Field of Classification Search
None
See application file for complete search history.

(56) References Cited

U.S. PATENT DOCUMENTS

| | | | |
|---|---|---|---|
| 4,291,002 A * | 9/1981 | Arnold et al. ............... 423/189 |
| 4,466,983 A | 8/1984 | Cifrese et al. | |
| 4,656,232 A | 4/1987 | Nakaki et al. | |
| 4,734,478 A | 3/1988 | Tsubakimoto et al. | |
| 4,857,610 A | 8/1989 | Chmelir et al. | |
| 4,893,999 A | 1/1990 | Chmelir et al. | |
| 5,298,570 A | 3/1994 | Tahara et al. | |
| 5,314,420 A | 5/1994 | Smith et al. | |
| 5,328,935 A * | 7/1994 | Van Phan et al. ............. 521/64 |
| 5,342,889 A | 8/1994 | Sullivan et al. | |
| 5,342,899 A | 8/1994 | Graham et al. | |
| 5,629,377 A | 5/1997 | Burgert et al. | |
| 6,323,252 B1 | 11/2001 | Gartner et al. | |
| 6,444,744 B1 | 9/2002 | Fujimaru et al. | |
| 6,602,950 B1 | 8/2003 | Dentler et al. | |
| 6,620,889 B1 | 9/2003 | Mertens et al. | |
| 6,710,141 B1 | 3/2004 | Heide et al. | |
| 6,727,345 B2 | 4/2004 | Kajikawa et al. | |
| 6,831,142 B2 | 12/2004 | Mertens et al. | |
| 6,835,783 B1 | 12/2004 | Gartner et al. | |
| 6,911,499 B1 | 6/2005 | Brehm et al. | |
| 6,916,864 B2 | 7/2005 | Gartner et al. | |
| 6,987,151 B2 | 1/2006 | Gartner et al. | |
| 7,179,862 B2 | 2/2007 | Mertens et al. | |
| 7,285,599 B2 | 10/2007 | Mertens et al. | |
| 7,342,058 B2 | 3/2008 | Peppmoller et al. | |
| 7,378,453 B2 | 5/2008 | Nogi et al. | |
| 7,473,470 B2 | 1/2009 | Ishizaki et al. | |
| 7,625,957 B2 | 12/2009 | Harren et al. | |
| 7,833,624 B2 | 11/2010 | Harren et al. | |
| 8,048,942 B2 | 11/2011 | Fricker et al. | |
| 8,063,121 B2 | 11/2011 | Fricker et al. | |
| 8,198,385 B2 | 6/2012 | Gartner et al. | |
| 8,252,873 B1 | 8/2012 | Gartner et al. | |
| 2003/0207997 A1 | 11/2003 | Mertens et al. | |
| 2004/0186229 A1 | 9/2004 | Heide et al. | |
| 2005/0171235 A1 | 8/2005 | Harren et al. | |
| 2007/0066167 A1 | 3/2007 | Wada et al. | |
| 2007/0078231 A1 | 4/2007 | Shibata et al. | |

(Continued)

FOREIGN PATENT DOCUMENTS

CA    1258338 A1    8/1989
CN    101094695 B   11/2011

(Continued)

OTHER PUBLICATIONS

International Search Report mailed on May 1, 2008 in PCT/JP2008/051777 (3 pages).
International Search Report mailed on Aug. 12, 2008 in PCT/JP2008/062041 (3 pages).
European Search Report mailed on Mar. 10, 2009 in European Application No. 08017544.8 (6 pages).
European Search Report mailed on Mar. 10, 2009 in European Application No. 08017545.8 (6 pages).
European Search Report mailed on Mar. 10, 2009 in European Application No. 08017543.3 (6 pages).
European Search Report mailed on Aug. 20, 2010 in European Patent Application No. EP10003452 (5 pages).
Loick et al., U.S. Appl. No. 13/876,736, filed Mar. 28, 2013.
"Superabsorbents," Ullmann's Encyclopedia of Industrial Chemistry, 6th Ed., vol. 35, Copyright 2003, pp. 73-93 (11 pages).
Wattebled et al., U.S. Appl. No. 14/110,579, filed Oct. 8, 2013.

(Continued)

*Primary Examiner* — Robert C Boyle
(74) *Attorney, Agent, or Firm* — Philip P. McCann; John P. Zimmer; Smith Moore Leatherwood LLP

(57) ABSTRACT

The present invention relates to a continuous process for the production of a superabsorbent polymer comprising providing an acidic liquid aqueous monomer mixture containing dissolved oxygen; continuously feeding the aqueous monomer mixture to a reactor; introducing a source of carbonate or hydrogen carbonate into the aqueous monomer mixture prior to entry into the reactor thereby forming a gas phase comprising carbon dioxide and at least a part of the dissolved oxygen, the gas phase being dispersed in the liquid phase; subjecting the gas/liquid mixture to at least partial phase separation immediately prior to or after entry into the reactor and at least partially removing the separated gaseous phase; subjecting the liquid phase in the reactor to free-radical polymerization to obtain the superabsorbent polymer, and continuously removing the superabsorbent polymer from the reactor.

15 Claims, 1 Drawing Sheet

(56) References Cited

U.S. PATENT DOCUMENTS

| | | |
|---|---|---|
| 2007/0123658 A1 | 5/2007 | Torii et al. |
| 2007/0129495 A1 | 6/2007 | Mertens et al. |
| 2008/0114095 A1 | 5/2008 | Peppmoller et al. |
| 2008/0140037 A1 | 6/2008 | Newman |
| 2008/0194863 A1 | 8/2008 | Weismantel et al. |
| 2008/0200623 A1 | 8/2008 | Weismantel et al. |
| 2008/0214749 A1 | 9/2008 | Weismantel et al. |
| 2009/0234314 A1 | 9/2009 | Nakamura et al. |
| 2010/0036004 A1 | 2/2010 | Harren et al. |
| 2010/0099799 A1 | 4/2010 | Fricker et al. |
| 2010/0105809 A1 | 4/2010 | Fricker et al. |
| 2010/0130950 A1 | 5/2010 | Harren et al. |
| 2010/0209379 A1 | 8/2010 | Furno et al. |
| 2012/0001122 A1 | 1/2012 | Wattebled et al. |
| 2012/0302445 A1 | 11/2012 | Rudolph et al. |

FOREIGN PATENT DOCUMENTS

| | | |
|---|---|---|
| DE | 3432690 A1 | 3/1985 |
| DE | 3544770 A1 | 6/1987 |
| DE | 19642761 A1 | 4/1998 |
| DE | 19846412 A1 | 4/2000 |
| DE | 102005014291 A1 | 9/2006 |
| DE | 102005042604 A1 | 3/2007 |
| EP | 688340 A1 | 12/1995 |
| EP | 827753 A2 | 3/1998 |
| EP | 1142925 * | 10/2001 |
| EP | 1142925 A1 | 10/2001 |
| EP | 1470905 A1 | 10/2004 |
| EP | 2116571 A1 | 11/2009 |
| EP | 2163302 A1 | 3/2010 |
| JP | 64033158 | 3/1989 |
| JP | 5086251 | 4/1993 |
| JP | 5239127 | 9/1993 |
| JP | 11322846 | 11/1999 |
| JP | 2000230129 | 8/2000 |
| JP | 2000313796 | 11/2000 |
| JP | 2001011328 | 1/2001 |
| JP | 2003206381 | 7/2003 |
| JP | 2004300425 | 10/2004 |
| JP | 2005111474 | 4/2005 |
| JP | 2006055833 | 3/2006 |
| JP | 2007119757 | 5/2007 |
| WO | 9305080 A1 | 3/1993 |
| WO | 9420547 A1 | 9/1994 |
| WO | 9816308 A1 | 4/1998 |
| WO | 0116197 A1 | 3/2001 |
| WO | 0139402 A1 | 5/2001 |
| WO | 03000621 A1 | 1/2003 |
| WO | 03004237 A1 | 1/2003 |
| WO | 03022896 A1 | 3/2003 |
| WO | 2004003036 A1 | 1/2004 |
| WO | 2006062609 A1 | 6/2006 |
| WO | WO 2006/062609 * | 6/2006 |
| WO | 2006134085 A1 | 12/2006 |
| WO | 2007028748 A1 | 3/2007 |

OTHER PUBLICATIONS

Buchholz, Frederick L. and Graham, Andrew T., "Modern Superabsorbent Polymer Technology," copyright 1998, John Wiley & Sons, Inc., Chapter 1: "Absorbency and Superabsorbency," pp. 1-17 (19 pages).

Buchholz, Frederick L. and Graham, Andrew T., "Modern Superabsorbent Polymer Technology," copyright 1998, John Wiley & Sons, Inc., Chapter 2: "Chemistry of Superabsorbent Polyacrylates," pp. 19-67 (51 pages).

Buchholz, Frederick L. and Graham, Andrew T., "Modern Superabsorbent Polymer Technology," copyright 1998, John Wiley & Sons, Inc., Chapter 3: "Commercial Processes for the Manufacture of Superabsorbent Polymers," pp. 69-117 (51 pages).

Buchholz, Frederick L. and Graham, Andrew T., "Modern Superabsorbent Polymer Technology," copyright 1998, John Wiley & Sons, Inc., Chapter 4: "Analysis and Characterization of Superabsorbent Polymers," pp. 119-165 (49 pages).

Buchholz, Frederick L. and Graham, Andrew T., "Modern Superabsorbent Polymer Technology," copyright 1998, John Wiley & Sons, Inc., Chapter 5: "The Structure and Properties of Superabsorbent Polyacrylates," pp. 167-221 (57 pages).

* cited by examiner

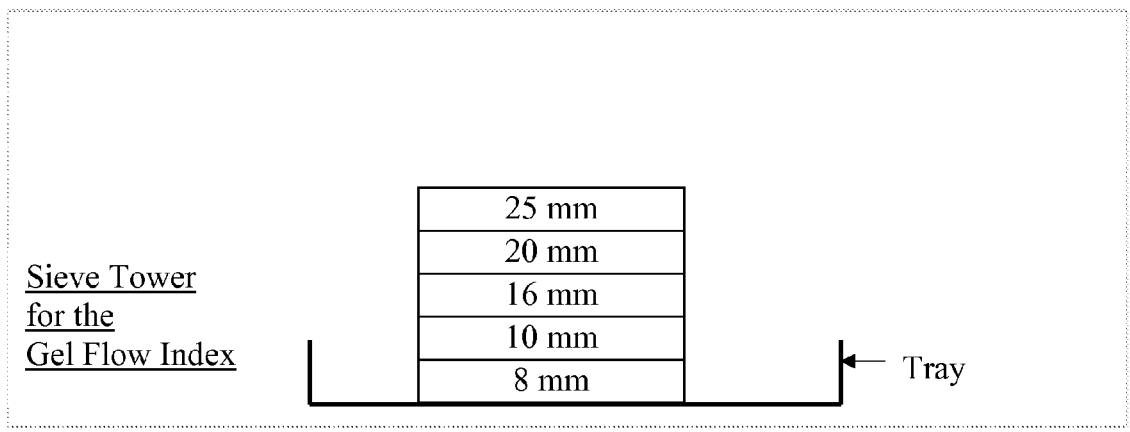

SUPERABSORBENT POLYMER PROCESS

This application is a continuation application of U.S. application Ser. No. 13/561,214 filed on Jul. 30, 2012, now pending, which is a continuation application of U.S. application Ser. No. 12/575,071 filed on Oct. 7, 2009, now U.S. Pat. No. 8,357,766, issued Jan. 22, 2013, which claims the benefit of U.S. Provisional Application No. 61/103,670 filed Oct. 8, 2008, the subject matter therein incorporated by reference. Embodiments of the present invention relates to a continuous process for the production of a superabsorbent polymer.

BACKGROUND OF THE INVENTION

The preparation of water-absorbent polymers is, for example, summarized in "Modern Superabsorbent Polymer Technology" F. L. Buchholz and A. T. Graham, Wiley-VCH, 1998, or in Ullmann's Encyclopedia Industrial Chemistry, $6^{th}$ ed. vol. 35 pp 73-103. The preferred preparation process is the solution or gel polymerization. When using this technology usually a monomer mixture is prepared which is discontinuously neutralized and then transferred into the polymerization reactor and is then discontinuously or continuously polymerized to form a polymer gel which is in case of a stirred polymerization comminuted. The polymer gel is subsequently dried, ground and sieved and optionally a surface treatment is applied.

Methods of continuous polymerization are, for example, described in WO-A-01/38402, WO-A-03/004237, WO-A-03/022896 and WO-A-01/16197.

Since the solution or gel polymerization is a free radical polymerization process this process is susceptible to the presence of oxygen. In free-radical polymerization oxygen is known to inhibit the polymerization reaction. Especially in continuous polymerization processes the presence of oxygen can create numerous problems since it makes the controlled start and progress of the polymerization difficult due to inhibition and chain termination reactions. Thus, in continuous polymerization reactions in the presence of oxygen it will be very difficult to control the radical polymerization and thus the desired properties of the final superabsorbent polymer. Furthermore it is known that the monomer solution is saturated with oxygen and that by feeding the monomer solution into the reactor an undesired high amount of dissolved oxygen is introduced into the polymerization process.

Thus, there were numerous attempts in the prior art to remove the dissolved oxygen from the monomer solution prior to the start of the free-radical polymerization reaction. In addition, measures were taken to conduct the free-radical polymerization reaction in an inert atmosphere.

U.S. Pat. No. 4,656,232 discloses a method for the polymerization of α,β-ethylenically unsaturated monomers to produce a superabsorbent resin by forwarding the aqueous monomer solution and an inert gas, each in the form of a continuous flow, toward the site of polymerization, spouting either of the two flows or fluids through a nozzle parallelly into the other flow thereby creating forced contact between the aqueous monomer solution and the inert gas and effecting substantial removal of dissolved oxygen from the aqueous monomer solution before the aqueous monomer solution reaches the site of polymerization. The aqueous monomer solution from which the dissolved oxygen has been removed is then admixed with the polymerization initiator and then subjected to polymerization in an atmosphere of inert gas. Inert gas is exemplified by nitrogen, carbon dioxide, argon, methane and ethane. By performing that process the concentration of dissolved oxygen in the aqueous monomer solution can be reduced from 7 ppm to 0.1 ppm.

WO-A-01/38402 relates to a continuous process for the preparation of a superabsorbent polymer. In this process the dissolved oxygen is removed from the monomer solution prior to transfer of the monomer solution into the reactor by directing an inert gas either cocurrently or countercurrently through the monomer solution whereby an appropriate admixing between the liquid phase and the gas phase can be achieved by valve, static or dynamic mixers or by a bubble column. The thereby inertized monomer solution is directed together with an inert gas stream through the reactor. Consequently, WO-A-01/38402 discloses the use of inert gas in two different stages of the process. First dissolved oxygen is removed from the monomer solution by applying an inert gas stream and then second the monomer solution is directed through the reactor together with an inert gas stream. Preferred inert gases are noble gases, like argon, carbonmonoxide, carbondioxide, sulfurhexafluoride, or mixtures of those gases. Only with respect to creating an inert gas stream within the reactor the possibility of creating the inert gas partially or completely by chemical reaction in the reactor, i.e. the mixing kneader, is disclosed. But in WO-A-01/38402 the use of nitrogen as inert gas when inertizing the monomer solution, as well as for the inert gas stream through the reactor is used. This is also evident from the examples in WO-A-01/38402.

WO-A-03/022896 discloses with specific reference to the examples the deoxygenation of the monomer mixture with a nitrogen stream creating a bubble column. The use of carbonates is only disclosed as a neutralizing agent in order to adjust the desired degree of neutralization of the monomer solution.

EP-B-688 340 with reference to the examples discloses a process for the preparation of superabsorbent polymers by preparing a monomer mixture in a beaker and thus under ambient atmosphere. Neutralization is performed by adding a solution of sodium carbonate in water with stirring. Thus, when preparing the neutralized monomer solution the aqueous solution is still saturated with dissolved oxygen. In the examples, in order to remove the dissolved oxygen, the monomer mix is sparged with nitrogen for one hour. Thus, the carbonate is used solely for neutralization purposes without any effect on the removal of dissolved oxygen.

From EP-A-827 753 a process for producing a water-absorbent resin capable of fast water absorption is known. The purpose of that process is to produce a sponge-like gel in order to obtain a fast water absorption. This is achieved by polymerizing a foam, i.e. a monomer solution containing dispersed inert gas bubbles. Although described in the general part of the specification as an optional component all the examples in that reference contain an emulsifier in the aqueous monomer solution in order to stabilize the foam. Furthermore, in the examples first the monomer solution is deoxygenated and then inert gas, especially nitrogen bubbles, are formed. Consequently, the inert gas bubbles in the foam that is subjected to polymerization are substantially free of oxygen which is in line with the teaching that polymerization is conducted in presence of the dispersed inert gas bubbles. The presence of oxygen in the dispersed inert gas bubbles would create the above problems related to inhibition and chain termination.

According to the teaching of the above discussed prior art references the aqueous monomer solution is deoxygenated prior to the start of the free-radical polymerization reaction. Thereby a considerable effort has been taken to ensure a preferably complete deoxygenation. According to the teaching of the prior art complicated mixing devices are necessary to ensure intimate mixing between the inert gas and the aqueous monomer mixture. A similar teaching is disclosed in U.S. Pat. No. 5,314,420.

Another problem of complete deoxygenation of the monomer mixture is that prior to the controlled start of the radical polymerization reaction, due to the lack of any inhibitor, it is difficult to avoid premature start of the polymerization within the monomer mixture, for example, in transfer lines. The problem is particularly pronounced in continuous polymerization processes since premature start of the polymerization reaction will result in the formation of gel prior to the entry of the monomer solution into the reactor resulting in fouling and blocking of transfer or off-gas lines. Especially in continuous processes this will influence flow rates and the whole process has to be periodically shut down for cleaning purposes.

WO-A-2007/028748 addresses this problem and suggests to include into the monomer solution 0.001 to 0.016 wt % of a polymerization inhibitor and that at least 50 volume percent of the used inert gas for inertization of the monomer solution is transferred together with the inertized monomer solution into the polymerization reactor. As polymerization inhibitor hydroquinone half-ethers and tocopherols are disclosed. Furthermore, it is described in WO-A-2007/028748 that the amount of inert gas used for inertization of the monomer mixture is considerably reduced compared to the amount known from the prior art.

As theory of the function of the proposed measures in WO-A-2007/028748 the following explanations are given. Due to the small amount of inert gas the monomer solution still contains more dissolved oxygen compared to the prior art which together with the inhibitor results in an increased inhibition of the monomer solution prior to entry into the polymerization reactor. In addition, the oxygen partial pressure in the gas phase is relatively high, so that oxygen during transport of the monomer solution to the polymerization reactor is still present for inhibiting purposes and due to the large interface area consumed dissolved oxygen can be supplemented by diffusion from the gas phase into the liquid phase to ensure sufficient inhibition during the transport of the monomer solution. In the reactor diffusion of oxygen from the gas phase to the liquid phase during the polymerization reaction is reduced due to the considerably reduced interface. But this clearly implies that oxygen is still present together with the added polymerization inhibitors within the reactor and thus during the free-radical polymerization reaction which has disadvantages, as discussed above. Thus, most of the prior art references teach to remove oxygen as completely as possible from the monomer solution prior to introduction of the monomer solution into the reactor in order to avoid any unwanted inhibition or chain termination reactions during the polymerization thereby creating problems of premature start of the polymerization reaction during transfer of the monomer mixture to the reactor. In WO-A-2007/028748 this problem is addressed by adding a polymerization inhibitor and by incomplete inertization of the monomer mixture but this technology has the disadvantage that considerable amounts of oxygen as well polymerization inhibitors are then present during the polymerization in the reactor.

Consequently, there is still a need for a continuous process for the production of superabsorbent polymers wherein premature start of the polymerization prior to entry of the monomer mixture into the reactor is minimized or avoided without adversely affecting the polymerization reaction by introducing too high amounts of oxygen or other inhibitors into the reaction mixture. According to another object of the present invention this goal is to be achieved without complicated devices in an economic way.

SUMMARY OF THE INVENTION

This problem has been addressed by a continuous process for the production of a superabsorbent polymer comprising:
(a) providing an acidic liquid aqueous monomer mixture containing dissolved oxygen, whereby the monomers are selected to provide after polymerization a superabsorbent polymer,
(b) continuously feeding said aqueous monomer mixture to a reactor,
(c) introducing a source of carbonate or hydrogen carbonate into said aqueous monomer mixture prior to entry into the reactor thereby forming a gas phase comprising carbon dioxide and at least a part of said dissolved oxygen, said gas phase being dispersed in the aqueous monomer mixture,
(d) subjecting the gas and aqueous monomer mixture to at least partial phase separation immediately prior to or after entry into the reactor and at least partially removing the separated second gas phase,
(e) subjecting the liquid phase in the reactor to free-radical polymerization to obtain the superabsorbent polymer, and
(f) continuously removing the superabsorbent polymer from the reactor.

The inventors have surprisingly discovered that by introducing a source of carbonate or hydrogen carbonate in the aqueous monomer mixture prior to entry into the reactor the aqueous monomer solution can be much more effectively deoxygenated prior to entry into the reactor compared to the methods known from the prior art using inert gas streams. Furthermore, since by using a carbonate or hydrogen carbonate source without any specific equipment or introduction of mechanical energy a dispersed gas phase is formed within the liquid phase whereby the gas phase comprises carbon dioxide and substantially all of the dissolved oxygen even a premature start of the polymerization reaction outside the reactor is sufficiently inhibited due to the presence of oxygen in the finally dispersed gas phase. Thus, blocking and fouling of transfer lines is minimized, even without further addition of any polymerization inhibitors. Due to the gas-liquid phase separation after entry into the reactor and at least partial removal of the separated gaseous phase the oxygen content of the reaction mixture in the reactor is considerably reduced, thus avoiding the inhibiting effect of oxygen on the polymerization reaction and an impairing effect on the product quality.

It was not foreseeable that due to the short time difference between addition of source of carbonate or hydrogen carbonate to the monomer mixture and entry of the mixture into the reactor the in situ formation of carbon dioxide will have any noticeable effect on the deoxygenation of the monomer mixture. Generally the residence time of the monomer mixture in any transfer lines after adding of the source of carbonate or hydrogen carbonate prior to entry into the reactor is less than about 30 s, usually less than about 20 s, but a residence time of even less than about 10 s is still sufficient to allow effective deoxygenation.

Thus, the above defined goal has been achieved in an economic way without applying any complicated devices since the aqueous monomer mixture can be transferred to the reactor via a transfer line, as well known in the art, and the source of carbonate or hydrogen carbonate, preferably an aqueous solution of carbonate or hydrogen carbonate source, can be injected by usual ports into the transfer line.

Although it is possible to inject additionally an inert gas stream into the monomer mixture, for example, within the transfer line or use an inert gas stream within the reactor the deoxygenation of the monomer mixture by the source of carbonate or hydrogen carbonate is so effective that either of additional introduction of inert gas into the monomer mixture or inert gas stream within the reactor can be avoided, or both. The effect of introduction of additional inert gas into the monomer mixture or inert gas within the reactor is anyway marginal when using the process according to the present invention.

FIGURE

The foregoing and other features, aspects and advantages of the present invention will become better understood with regard to the following description, claims, and the drawing where:

FIG. 1 is a side view showing a sieve stack in a plastic tray.

DETAILED DESCRIPTION OF THE PRESENT INVENTION

The present invention involves the polymerization of a suitable monomer mixture in order to produce a superabsorbent polymer in a free radical polymerization process. The superabsorbent polymers prepared by the process of the present invention are water-swellable and lightly crosslinked polymers and can be selected from the known hydrophilic polymers which are capable of absorbing large quantities of fluids. Preferred water-absorbent polymers are water-absorbent polymers that contain carboxyl moieties. Preferably at least about 0.01 equivalent of carboxyl groups are present per 100 g of the water-absorbent polymer. Among preferred carboxyl-containing water-absorbent polymers are partially neutralized products of starch-acrylic acid or polyvinyl alcohol graft copolymers, crosslinked products of hydrolysates of acrylamide copolymers, partially neutralized products of polyacrylic acids and crosslinked products of partially neutralized polyacrylic acids.

According to one embodiment of the present invention the monomer mixture comprises at least one ethylenically unsaturated acid and at least one monomer bearing at least two ethylenically unsaturated groups that function as a covalent crosslinker. Suitable $\alpha,\beta$-ethylenically unsaturated acids include, for example, acrylic acid, methacrylic acid, crotonic acid, isocrotonic acid, itaconic acid and 2-acrylamido-2-methyl-1-propane sulfonic acid. These acids can be used in the acidic form, but it is more preferred to use the a, p-ethylenically unsaturated acids in their at least partially neutralized form as alkali metal salts and ammonium salts.

The preferred unsaturated acids include acrylic acid and methacrylic acid in their respective salt forms, such as alkali metal or ammonium salts. Optionally minor amounts of other water-soluble unsaturated monomers, such as alkyl esters of the acid monomers including, for example, methylmethacrylate, methylacrylate, acrylamide or methacrylamide or (meth)acrylates of polyethyleneglycol methyl ether may be present in the monomer mixture. The monomers are employed in aqueous solution, preferably in amounts ranging from about 10 wt % to about 80 wt % based on the total weight of the aqueous monomer solution. Preferably the amount of monomer ranges from about 15 wt % to about 60 wt % based on the total weight of the aqueous monomer solution. In addition, certain grafting polymers such as, for example, polyvinyl alcohol, starch and water-soluble or -swellable cellulose ethers may be employed to prepare the products. Such grafting polymers when employed are used in amounts of up to about 10 wt % based on the $\alpha,\beta$-ethylenically unsaturated monomer.

The water-absorbent polymer is preferably lightly covalently crosslinked to render it water-insoluble and water-swellable. The desired crosslinked structure can be obtained by including into the monomer mixture a crosslinking agent possessing at least two polymerizable double bonds in the molecular unit. The crosslinking agent is employed in an amount effective to covalently crosslink the water-soluble polymer. The preferred amount of crosslinking agent is determined by the desired degree of absorption capacity and the desired strength to retain the absorbed fluid that is the desired absorption against pressure (AAP) respectively the absorption under load (AUL). The crosslinking agent advantageously is used in amounts ranging from about 0.0005 to about 5 parts by weight per 100 parts by weight of the $\alpha,\beta$-ethylenically unsaturated monomer used. More preferably the amount ranges from about 0.1 part by weight to about 1 part by weight per 100 parts by weight of the $\alpha,\beta$-ethylenically unsaturated monomer. Usually if an amount of higher than about 5 parts by weight of crosslinking agent per 100 parts of monomer is used the polymers will have a crosslinking density that is too high and will exhibit reduced absorption capacity and increased AUL. If the crosslinking agent is used in amounts of less than about 0.0005 parts by weight per 100 parts of monomer the polymer usually has a crosslinking density that is too low and when contacted with the fluid to be absorbed becomes sticky and exhibits a lower initial absorption rate.

While the covalent crosslinking agent preferably is soluble in the aqueous solution of the $\alpha,\beta$-ethylenically unsaturated monomer the crosslinking agent may be merely dispersed in such a solution. Examples of suitable dispersing agents include carboxymethyl cellulose suspending aids, methyl cellulose, hydroxypropyl cellulose and polyvinyl alcohol. Such dispersing agents are advantageously provided at a concentration between about 0.0005 and about 0.1 wt % based on the total weight of $\alpha,\beta$-ethylenically unsaturated monomer.

Suitable covalent crosslinking agents include compounds having in one molecule two to four groups selected from the group consisting of $CH_2=CHCO-$, $CH_2=C(CH_3)CO-$ and $CH_2=CH-CH_2-$. Exemplary covalent crosslinking agents include diallylamine; triallylamine; diacrylates and dimethacrylates of ethylene glycol, diethylene glycol, triethylene glycol, propylene glycol, 1,4-butanediol, 1,5-pentanediol, 1,6-hexanediol, neopentyl glycol, trimethylolpropane and pentaerythritol; triacrylates and trimethacrylates of trimethylolpropane and pentaerythritol; tetra-acrylate and tetramethacrylate of pentaerythritol; allyl methacrylate; and tetraallyloxyethane; and acrylates of the highly ethoxylated derivatives of trimethylolpropane or pentaerythritol having 3 to 30 ethylene oxide units, such as highly ethoxylated trimethylol propane triacrylate, tetra-acrylate and tetramethacrylate of pentaerythritol, and allyl methacrylate. Mixtures of covalent crosslinking agents can be employed.

The polymerization may be carried out using acid monomers that are not neutralized or that have been fully or partially neutralized prior to the polymerization. Neutralization is conveniently achieved by contacting the aqueous monomer solution with an amount of base sufficient to neutralize between about 10% and about 95% of the acid groups present in the acid monomers. Preferably the amount of base will be sufficient to neutralize between about 40% and about 85%, and most preferably between about 55% and about 80% of the acid groups present in the acid monomers.

Suitable compounds that are useful to neutralize the acid groups of the monomers include those bases that will sufficiently neutralize the acid groups without having a detrimental effect on the polymerization process. Examples of such compounds include alkali metal hydroxides, alkali metal carbonates and hydrogen carbonates.

A conventional vinyl addition polymerization initiator may be used in the polymerization of the water-soluble monomers and the crosslinking agent. A free-radical polymerization initiator that is sufficiently soluble in the monomer solution to initiate polymerization is preferred. For example, water-soluble persulfates such as potassium persulfate, ammonium persulfate, sodium persulfate, and other alkali metal persulfates, hydrogen peroxide and water-soluble azo-compounds such as 2,2'-azobis-(2-amidinopropane)hydrochloride may be used. So-called redox initiator systems such as hydrogen peroxide or sodium persulfate which can be used as oxidizing component can be combined with reducing substances such as sulfites, amines or ascorbic acid. The amount of initiator used may range from about 0.01 wt % to about 1 wt %, preferably about 0.01 wt % to about 0.5 wt % based on the total weight of the $\alpha,\beta$-ethylenically unsaturated monomer.

Furthermore, it is possible and even preferred, to recycle fines of superabsorbent polymers into the preparation process. As fines are considered those particles, which are too small for the desired application as defined by the product specification. This undesired product fraction is, therefore, removed from the granulated polymer. The fraction of fines can be determined by sieving using EDANA Standard Test Method WSP 220.2(5). This test is incorporated herein by reference. Fines can also be generated by applying a fluidized bed for heating particulate superabsorbent polymers. By the hot air stream particles may be elutriated having a diameter of up to about 300 μm. Polymer particles having a particle size of less than about 300 μm, or less than about 200 μm are defined as fines in accordance with the present invention.

The fines may be recycled to any stage of the process according to the present invention but, as will be discussed in more detail below, it is particularly preferred to recycle the fines into the monomer mixture. Furthermore, other suitable additives may be added to the monomer mixture at a suitable point during the process, as will be discussed below. Other additives may be selected, for example, from alkali metal chlorate, polyethylene glycol, aqueous solution of pentasodium salt of diethylene triamine pentaacidic acid (Versenex 80), water insoluble organic or inorganic powder such as water insoluble metal oxides like silica or zinc oxide, surfactants, dispersing aids, agents to control odor like silver salts or other processing aids.

Without wanting to be limited, the present invention will now be discussed in more detail with respect to acrylic acid as most preferred ethylenically unsaturated acid for the preparation of superabsorbent polymers. But a person skilled in the art will appreciate that the same process may be conducted using different monomers or mixture of monomers.

According to a preferred embodiment of the present invention the liquid aqueous monomer mixture is preferably an aqueous monomer solution that is continuously prepared in a circulation line with an integrated buffer vessel. Several production lines can be served from this system for preparing the monomer solution. Upstream of the circulation line an inline mixing system with integrated heat exchanger for the dilution of the caustic (aqueous sodium hydroxide solution) from about 50% to about 20% with deionized water, or preferably with process water, and for the addition of additives such as Versenex 80, is provided.

The circulation of the monomer solution is forced by a pump. The pump sucks the monomer solution from the bottom side of the buffer vessel and conveys it via circulation lines and at least one integrated heat exchanger back to the top side of the vessel. Between the discharge point of the vessel and the circulation pump there is injected into the circulation line in direction of the flow the diluted caustic first, followed by the injection of at least one part of the total required amount of acrylic acid. Preferably about 70% of the total required amount of acrylic acid or less is injected at this point so that the monomer solution in the buffer vessel has a pH of at least about 8 allowing the acrylic acid dimers and oligomers of the acrylic acid to be cracked into acrylic acid and β-hydroxy propionic acid. The entire degree of neutralization (DN) of the unsaturated acid, especially acrylic acid. in the monomer solution prior to polymerization is in the range of about 50% to about 85%, more preferably between about 65% and about 75%. More than about 70% or even all of acrylic acid needed for the desired degree of neutralization may be fed at this point of the process in case that the used acrylic acid has a low dimer concentration.

The monomer solution in the circulation line between acrylic acid addition point and heat exchangers can reach temperatures of up to about 80° C. The heat exchangers control the temperature of the solution in the rest of the circulation line and in the buffer vessel in the range from about 4° C. to about 40° C. The heat exchangers may be operated with either cooling water, by a glycol-water system or by other cooling media.

The buffer vessel and the circulation lines consist of a suitable type of stainless steel. The surfaces on the product side are optionally post-passivated or provided with a suitable coating (Teflon, PTFE, cam-resist etc.). Optionally the vessel and the lines consist of a suitable plastic such as PE or PP.

The amount of monomer solution for the continuously operated polymerization process is taken continuously from the circulation line of the monomer preparation system in flow direction after the last heat exchanger but before the injection of the caustic and is transferred to the reactor. At this point the monomer solution containing dissolved oxygen in general is saturated with dissolved oxygen. The transfer line can be of the same material and construction as the circulation line. The transferred monomer solution has preferably a temperature in the range of about 4° C. to about 35° C. and its transfer rate to the reactor in one embodiment of the present invention equals a fraction in the range of about 5% to about 50% of the flow rate in the circulation line.

The possibly still missing fraction of the ethylenically unsaturated acid, for example, acrylic acid in the monomer solution at this point is preferably about 30% of the total required amount. The remaining monomer, crosslinkers, at least some of the required initiators such as hydrogen peroxide, sodium persulfate and optionally a coinitiator, and optionally further required additives can be injected into the transfer line at the suitable position. The only important requirement is that prior to the addition of the source of carbonate or hydrogen carbonate to the aqueous monomer mixture the pH of the monomer solution should be adjusted by addition of the missing fraction of the unsaturated acid, for example, acrylic acid to obtain an acidic liquid aqueous monomer mixture.

In case a redox initiation system is used the oxidative component of the initiating system, like hydrogen peroxide is added at an early point in the transfer line in flow direction and the reductive component of the initiating system, like ascorbic acid or salts thereof is added at the very end of the transfer line, i.e. just prior to the point where the monomer mixture enters the reactor. Optionally the reductive component may also be added directly to the reactor. But due to better homogenization in the transfer line it is preferred to add the reductive component at the very end of the transfer line just prior to entry into the reactor.

According to one preferred embodiment of the present invention the sequence of addition may be in the following order. After the monomer solution has been withdrawn from the circulation line, as explained above, the remaining amount of, for example, acrylic acid in order to achieve the desired total degree of neutralization and to obtain an acidic liquid aqueous monomer mixture is added. Then the crosslinker is added, optionally followed by, for example, sodium chlorate, followed by the oxidative component of the redox initiation system, like hydrogen peroxide and/or sodium persulfate. Thereafter optionally the fines of superabsorbent polymer as defined above are added, followed by the introduction of the source of carbonate or hydrogen carbonate. Finally, at the end of the transfer line just prior to entry into the reactor, the reductive component of the redox initiator, like ascorbic acid is injected. Alternatively the reductive component is directly injected into the reactor at a position in proximity to the entry point of the monomer mixture, such that it homogenizes with the monomer mixture in the reactor. According to a preferred embodiment of the present invention the transfer line is equipped with at least one, preferably several inline mixers in order to obtain a homogenous distribution of the added components in the monomer solution. The inline mixers may be in the form of at least one disk having an eccentrically arranged boring of a suitable size for providing turbulent flow. Preferably several of those disks are inserted in series such that the holes are arranged in a staggered way so that a homogenous monomer solution is achieved.

If fines are added to the monomer solution the portion of fines to be recycled to the process is about 2 wt % to about 20 wt %, preferably about 5 wt % to about 18 wt % based on the weight of the ethylenically unsaturated acid, for example, acrylic acid in the reaction mass. The advantage of recycling the fines into the monomer solution is that the particles get integrated and firmly bound in the polymer matrix obtained by polymerization of the monomer solution containing the dispersed fines. Particularly in process operations downstream, such as grinding, sieving and polymer post-treatment such recycled fines will no more separate from the polymer product. The disadvantage of this technology, however, may be that the fines present during polymerization may reduce the final product quality either by grafting to the polymer or due to the oxygen that is adsorbed to the surface of the fines and thus will be carried into the monomer solution and are difficult to be removed. Due to the small particle size of the fines and thus resulting in high specific surface area the amount of air and thus oxygen adsorbed to the polymer fines and thus entrained into the monomer solution is considerable. That is one reason why fines previously were preferably not introduced into the monomer solution despite the above discussed advantages. For example, WO 03/022896 discloses to recycle the polymer fines into the first reactive zone and not to the monomer mixture.

But the problem of oxygen entrainment into the monomer solution by addition of the fines has been addressed by the present invention. When the source of carbonate or hydrogen carbonate is introduced into the aqueous monomer mixture after injection of the polymer fines in the transfer line in the direction of flow not only the oxygen dissolved in the monomer mixture but also the oxygen entrained into the monomer mixture by incorporation of the fines can be effectively removed from the monomer mixture. It is a surprising result of the present invention that even after addition of polymer fines in amounts within the above defined limits and thereafter introduction of a source of carbonate or hydrogen carbonate the oxygen concentration in the monomer mixture just prior to the entry point into the reactor at the end of the transfer line after phase separation is about 0.3 ppm or lower. Consequently the present invention is particularly effective in a process where polymer fines are added prior to the introduction of a source of carbonate or hydrogen carbonate to the aqueous monomer mixture.

As source of carbonate or hydrogen carbonate any suitable material may be used. It is preferred to use an aqueous solution of an alkali metal carbonate or hydrogen carbonate, or mixtures thereof. Sufficient deoxygenation is achieved if about 1% to about 15%, preferably about 2% to about 10%, and more preferred about 2% to about 7% of the total neutralization of the acidic functionality of the resultant superabsorbent polymer to achieve the respective degree of neutralization of the resultant superabsorbent polymer is performed by the source of carbonate or hydrogen carbonate.

According to a particularly preferred embodiment of the present invention the source of carbonate or hydrogen carbonate is at least a part of a carbonate or hydrogen carbonate-containing aqueous scrubber solution that is obtained in the process of the present invention, as will be discussed below.

Upon contact with the acidic monomer mixture the carbonate neutralizes a further portion of the ethylenically unsaturated acid, for example, acrylic acid, thereby releasing carbon dioxide gas. Depending on the temperature of the monomer mixture and the pressure in the transfer line a minor portion of this gas is dissolved in the solution but the major portion separates from the liquid phase by forming very homogenously distributed small gas bubbles. The oxygen dissolved in the monomer mixture and, if fines are added entrained by the addition of fines, migrates into dispersed gas phase and gets removed thereby. Due to the in situ formation of the gas bubbles and the homogenous dispersion of the gas bubbles in the liquid aqueous phase removal of the oxygen from the monomer mixture, irrespective of whether additional oxygen is entrained by the addition of fines, is very effective.

By performing the monomer mixture preparation and the addition of the various components into the transfer line, as described above, premature polymerization of the monomer solution within the transfer system can be effectively avoided.

Polymerization is usually prevented by the additional inhibitors, and commercially available acrylic acid is generally stabilized by about 200 ppm of hydroquinone monomethylether (MEHQ). But even if MEHQ is present it is possible that undesired premature polymerization of the monomer solution occurs caused by e.g. traces of metal ions, like iron in the monomer solution, and by shear forces, and particularly by the action of the initiators. This can cause fouling in the monomer solution preparation system and even immediate blockage of the transfer line to the reactor. This can be effectively avoided by the present invention. As explained above, the monomer mixture prior to the incorporation of the source of carbonate or hydrogen carbonate contains and is preferably saturated with oxygen. More complete saturation can, for example, be achieved by continuously feeding air through a bottom valve into the monomer solution of the buffer vessel at an appropriate rate of preferably about 0.5 m$^3$/h to about 15 m$^3$/h. Due to the presence of oxygen in the monomer mixture any premature polymerization within the monomer mixture preparation section of the process of the present invention can be effectively avoided.

As explained above, due to the very effective deoxygenation of the monomer mixture by incorporation of a source of carbonate or hydrogen carbonate the previous saturation of the monomer mixture with oxygen will have no negative effect on the polymerization process.

Furthermore, since the oxygen previously dissolved in the monomer mixture is still within the finely dispersed gas bubbles in the aqueous monomer mixture polymerization is sufficiently inhibited for the remaining residence time between incorporation of the source of carbonate or hydrogen carbonate and entry into the reactor.

As reactors for the continuous process of the present invention any suitable reactor for a continuous solution and gel polymerization of superabsorbent polymers as known from the prior art can be used. Particularly preferred are reactors that are capable of mixing, kneading and forwarding the reaction mass through the reactor within a desirable time frame. Particularly preferred are continuous kneaders and extruders. Particularly advantageous for the purpose of the present invention are those reactors containing two or more screws or kneading shafts that function at least in part to convey the vessel content along the axis of the vessel. In a preferred embodiment one of the shafts acts as a kneading shaft and the other acts as cleaning shaft. The rotation speed of the two shafts may be different although the speed can be the same for both shafts. Preferably these shafts rotate in opposite directions and the radius of the shafts is overlapping. In a preferred embodiment the two shafts are at least substantially parallel to each other. However, it is also possible to apply a vessel having more than two shafts, a vessel with shafts that rotate in the same direction, a vessel in which the radius of the shafts does not overlap, a vessel in which the shafts are not at least substantially parallel, or any combination of these. Suitable reactors are available, for example, from List AG, CH-4422 Alsdorf, Switzerland, especially suitable is the Conti-Version of the Opposite-Rotating-Processor (ORP), the Discoterm Conti (DTP), the Co-Rotating Processor (CRP) and (AP) as well as the processor of the CRK type. Suitable kneader reactors are available from Buss AG, Hohenrainstrasse 10, 4133 Pratteln (Switzerland). Other suitable reactors are those described in DE-OS 3432 690. Also particularly preferred for polymerization are apparatuses as described in DE-OS 3544 770, disclosing belt reactors having an endless conveyer belt on which polymerization is continuously performed.

According to the present invention an important feature is that the gas-liquid mixture wherein the gas phase is homogenously distributed in the aqueous monomer mixture is separated either immediately prior to entering the reactor or immediately after entering the reactor. For the first embodiment the gas phase may be separated from the liquid phase by any device suitable for gas-liquid phase separation, like for example, a cyclone-type device. Any device or set-up applied for gas-liquid separation has to enable the gas bubbles to leave the monomer mixture prior gelation.

But since the monomer mixture used according to the present invention preferably does not contain surfactants that might stabilize the bubbles of the dispersed gas phase, phase separation occurs when the monomer mixture enters the reactor. The separated gas phase, the second gas phase, is then at least partially removed from the reactors, for example, via the vent system.

The inventors have now surprisingly realized that a particularly fast phase separation without any additional devices for gas-liquid phase separation is achieved immediately upon entry of the monomer mixture into the reactor if a pressure difference between the transfer line in the reactor can be provided such that the pressure in the reactor is lower than the pressure in the monomer feed line. Preferably the pressure in the transfer line is kept above atmospheric pressure with the aid of a pressure valve and the pressure in the reactor is atmospheric or subatmospheric. The pressure difference is preferably in the range from about 0.5 bar to about 5 bar and the pressure in the reactor is from about 500 mbar to about 1,100 mbar absolute. More preferred is a pressure difference in the range of about 1 to about 3 bar and a pressure in the reactor of about 600 to about 850 mbar absolute.

Furthermore, an inert gas feed stream may be introduced into the head space in the reactor in order to facilitate removal of the oxygen-containing gas phase from the polymerization reactor. But, as already mentioned above, such an inert gas feed stream is not necessary according to the present invention and can be omitted without compromising control of the polymerization reaction and product quality. Suitable inert gases for the feed stream are those known from the prior art, for example nitrogen, carbon dioxide, or noble gases like argon, whereby nitrogen is particularly preferred. Furthermore, as mentioned above, the pressure within the reactor may be subatmospheric by applying a light vacuum to the reactor which does not only facilitate the removal of the oxygen-containing gas phase but has additional advantages, as will discussed below, According to a preferred embodiment in the process of the present invention a reactor is used encompassing at least three zones, wherein the first zone is an initiation zone, the second zone is a gel phase zone and the third zone is a granulation zone, whereby the monomer mixture is fed to the initiation zone. Especially when using a continuous kneader having two shafts, as discussed above, the inlet connection of the transfer line is installed at the feed end of the reactor such that the solution is fed to zone one of the reactor, such that it is at the inside of the reactor centrically between the two shafts to be homogenously mixed with the reaction mass in this zone. When applying the preferred embodiment as discussed above, wherein the indicated pressure difference between transfer line and reactor is used and the reactor is operated under subatmospheric pressure the gas phase separates upon entry into the reactor from the liquid phase and is directed via the vacuum system and the vent system to further processing, as will be discussed below.

The reactor may be continuously charged with monomer solution at the rate of about 0.5 kg/h to about 5 kg/h, preferably about 1.2 kg/h to about 3.5 kg/h per liter of total reactor volume. The monomer mixture as fed to the reactor has usually a temperature in the range of about 4° C. to about 35° C. For economical reasons the temperature is preferably above about 20° C. This saves energy for cooling down the solution and the temperature of the reaction mass during polymerization can be reliably controlled by other means.

The following options can be used to control the total energy input into the system. There is the option of controlling the total heat of polymerization generated by accordingly selecting the type and adjusting the concentration of the monomers in the monomer solution. The temperature of the monomer feed can be provided within the temperature range as given above, steam can be injected into the initiation zone of the reactor and finally there is the option of heating via jacket and shafts of the reactor. This might be required if the monomer feed cools the initiation zone in the reactor too much so that the rate of initiation and polymerization drops too much, resulting in a too long residence time in the reactor required for sufficient monomer conversion.

Energy can be removed from the reaction mass by cooling via jacket and shaft and very efficient cooling is achieved by evaporation of parts of the water present in the reaction mass. Most efficient cooling is achieved by evaporation under reduced pressure in the reactor. Consequently, operating the reactor under subatmospheric pressure has, in addition to the above discussed effects of fast and safe separation of the gaseous phase upon entry of the monomer mixture into the reactor without any additional phase separating devices the benefit of an efficient temperature control. A considerable portion of the energy of the system is also removed by the gel as it is discharged from the reactor. The amount depends on the heat capacity of the gel and its temperature.

The monomer concentration is usually not used to control the reaction temperature. For economical reasons it is desirable to raise the concentration to the highest possible level which is usually given by the limit of solubility. So, for temperature control there are all the other options left. Most preferably a combination of the options is applied by which the desired temperature in the various zones of the reactor is preferably addressed. Preferably the reaction mass in the first zone of the reactor has a temperature in the range of about 50° C. to about 100° C., preferably about 65° C. to about 90° C., in the second zone a temperature (peak temperature) in the range of about 65° C. to about 110° C., preferably about 80° C. to about 100° C. and in the last zone a temperature below about 100° C., preferably below about 95° C. These temperatures in the various zones can be reliably adjusted by the fact that jacket and shaft of the reactor are divided into several segments in which the temperature can be individually adjusted. This enables the temperature control of the initiation zone and of the last zone of the reactor. The peak temperature which occurs somewhere in the second zone is preferably reliably controlled by evaporation under the corresponding pressure for the desired temperature.

The shafts of the reactor are preferably operated at a speed of about 50% of the operational limit. The shear forces generated by the kneading tools allow sufficient granulation of the hydro gel so that a free-flowing gel is obtained having a mass average gel particle size in the range of about 3 mm to about 5 mm containing a fraction of gel particles above 6 mm of no more than about 30%.

The reaction mass needs to stay in the reactor until sufficient conversion has occurred, the gel is sized to the desired degree and no further temperature control is required. At this point the conversion has reached a degree of at least about 90%, more preferably about 95% and most preferred more than about 99%. This correlates to a residence time depending on the throughput in the range of about 3 min to about 40 min, more preferably from about 4 min to about 20 min. Throughputs in the range of about 0.5 kg/h to about 5 kg/h of monomer solution per liter of total reactor volume are possible.

The gel is discharged from a last zone of the reactor which is located at the opposite end with respect to the feed or initiation zone of the reactor. Using the preferred embodiment of the reactor the gel is wiped out of the reactor by the cleaning shaft over an adjustable weir through an opening in the housing at the side of the cleaning shaft.

It is preferable for smooth production conditions to have a buffer containment for polymer gel between the reactor and the next unit downstream of the process. In addition to maintaining a desirable quantity of buffer material the vessel also serves as a hold tank to allow further conversion of the polymer gel to a conversion of above about 99%, even more preferred of above about 99.5%. It furthermore provides an additional location where additives can be charged to the polymers and be mixed in. The design of that vessel is not critical as long as it provides tools for adequate agitation and for keeping up the desired temperature of the gel. Preferably the containment is insulated to keep the gel at the desired temperature, allows substantial plug flow and is designed such that the polymer gel can continuously and reliably be charged and discharged. The containment can be a vessel that is horizontally or vertically arranged, a single or multiple screw conveyor or a moving belt. The containment can serve multiple production line processes up- and downstream. In case several gel dryers are served with gel from one buffer vessel an adequate number of junctions are installed in order to properly divide the gel stream.

The resultant polymer is typically pre-sized and dried using means well known in the art. Suitable drying means include fluidized bed dryers, rotary dryers, forced air ovens, through-circulation vent dryers and belt dryers. In some instances drying will occur in two or more stages, i.e. multistage drying. Following the completion of drying the polymer is further sized to form particles, preferably having a weight average diameter of less than about 2 mm and more preferred less than about 1 mm. Preferably the final polymer product has an average particle size of at least about 300 µm.

After drying and sizing usually the superabsorbent polymer is classified, for example, by sieving in order to remove particles having a too low particle size which is not acceptable for the intended commercial use of the superabsorbent polymers.

These fines can be recycled to any point of the process of the present invention whereby it is a particular advantage of the process of the present invention when these fines can be recycled to the monomer mixture, as explained above.

Furthermore, it is desired that the dried particles may be heat treated or surface treated in order to improve the product properties, as is known in the prior art. For example, the dried particles may be heat treated in accordance with the procedures set forth in WO 93/05080 and/or U.S. Pat. No. 5,629,377. Such heat treatment is preferably carried out at a temperature of at least about 170° C., more preferably of at least about 180° C., and most preferably of at least about 190° C. Such heat treatment is preferably carried out at a temperature of less than about 250° C., more preferably less than about 240° C. The method of heat treatment is not critical. For example, forced air ovens, fluidized bed heaters, paddle dryers and heated screw conveyors can be successfully employed. If desired, the heated polymer may be remoisturized for ease in handling. A way to improve absorptive properties of the polymer particles may be to surface-crosslink the polymer particles. Procedures for surface-crosslinking are well known in the art and described in, for example, U.S. Pat. No. 4,734,478 and U.S. Pat. No. 4,466,983. These procedures may increase the modulus and/or the absorbency under load of the polymer particles. Surface modification may be also achieved by incorporation of additives like aluminum salts or silica.

When, as discussed above, according to a preferred embodiment of the present invention the reactor is operated under subatmospheric pressure and temperature control applies evaporation of water condensates are generated in the process. The total volume of condensates generated by the polymerization reaction depends on the process conditions. These conditions determine the final energy balance and hence the part evaporation has in the temperature control system. The total amount of energy in the system is a balance of the energy streams which either add or remove energy from the system. Adding energy streams are the polymerization and the feed streams (depending on their temperature), heat transfer from the jacket into the reactor, dissipation of mixing energy and optionally steam injection. The energy removing streams are the energy of the gel discharged according to the given heat capacity of it and depending on the gel discharge temperature, heat transfer from the reactor to the jacket and energy consumed by evaporation. Under the above discussed preferred conditions the amount of water to be evaporated is in the range of about 8% to about 18% based on the water present in the reaction mass. It can be removed from the reactor and separately be treated or it can be condensed and either be taken back to the gel in the reactor or to any of the downstream steps of the process until the gel is dried. It, alternatively, can be recycled to any of the suitable upstream steps of the process, preferably to the first zone of the reactor together with the reductive component of the redox initiator or to the unit for the preparation of the monomer solution.

For economical reasons it would on one hand be preferable to remove the evaporated fraction of water from the gel in order to maximize the solids content of the gel and hence not to generate the need of evaporation of the condensates. It has, however, be found that recycling of at least a part of the condensate to the gel reduces its stickiness and thus improves the flow behavior.

On the other hand it would be desirable to recycle the condensate to the monomer solution or the unit for its preparation, as far as it is not needed to improve the flow behavior of the gel. But before the present invention it was considered that due to possible impurities in the condensate recycling of the condensate to an upstream portion of the process may have a negative influence on process stability and product quality. Surprisingly, the inventors found that recycling the condensate, as described above, replacing the corresponding fraction of water of the recipe did not show any undesired impact.

Another option is to apply the condensate stream for diluting the caustic to be used for the scrubber. The condensate contains acrylic acid as the main component in a concentration in the range of about 0.5 wt % to about 2 wt. %. In addition there are traces of other organic acids, such as acidic acid and propionic acid. Inhibitors, such as MEHQ if applied and derivatives and degradation products of it and also traces of metal ions, i.e. Fe ions, which may result from the contact of the acid with metallic surfaces of equipment or from other sources, may be present, as will be discussed below.

Furthermore, any vent streams generated in the progress of the process of the present invention need to be treated prior to their release to the atmosphere in order to limit the emission of the plant to the required standards. Such vent streams are the inert gas stream which was used to deoxygenate the monomer solution, the vent stream from the reactor, from gel sizing and the major gas stream resulting from the gel drying operation. The vent streams from the storage tanks, in particular from the acrylic acid tanks, and optionally gas streams from the product post-treatment processes are also directed to the scrubber for purification.

According to one embodiment the scrubber comprises a vertical column packed with filling material, such as Raschig rings and diluted caustic is sprayed from the top onto the packing of the column and flows down through the packing material into the bottom area of the scrubber. For purification the vent streams are fed to the bottom of the column and on its way to the top of the column the gas stream is finely divided by the packing and the impurities are taken up by the aqueous phase.

The scrubber water that is when freshly prepared applied to the scrubber comprises up to about 5 wt % of sodium hydroxide in order to be able to reliably remove all the traces of acrylic acid and other impurities from the vent streams.

Some of the originally fed sodium hydroxide is, however, converted into carbonates or hydrogen carbonates resulting from the contact of the diluted caustic in the scrubber with the carbon dioxide in the vent stream. Therefore, the scrubber water as removed from the scrubber contains some residual caustic, from about 4 wt. % to about 10 wt. % carbonates or hydrogen carbonates, and in addition to the bases basically the same components as the condensate, but usually in higher concentrations. The total solids content of the scrubber solution is in the range of about 10 wt. %. A portion thereof consists of the superabsorbent fines dust which is carried in by the vent stream from the gel dryers. As the most crucial impurities are seen to be calcium and iron ions, acetic and formic acid, inhibitors and derivatives of it, and also carbonate and other impurities.

A further concern of recycling scrubber water is its brown color which might discolor the final product if recycled to the process step.

But, nevertheless, it would be desirable if the condensate, as well as the scrubber water can be recycled back to the process as to save valuable raw material, i.e. acrylic acid and superabsorbent polymer dust and to omit separate disposal of these aqueous streams.

It has now been surprisingly discovered that the scrubber water can be recycled at least in part to the monomer mixture as a source of carbonate or hydrogen carbonate according to the present invention. As explained above, the scrubber water contains about 4 wt. % to about 10 wt. % of carbonate and/or hydrogen carbonate and is, therefore, well suited as a source for carbonate or hydrogen carbonate according to the present invention. Surprisingly, despite the numerous additional impurities that were thought to possibly adversely affect the stability of the process and/or the product quality no such adverse effects could be detected.

Thus, as a preferred embodiment the present invention provides for a continuous process for the preparation of superabsorbent polymers wherein all the process streams containing valuable materials can be effectively recycled to the process without jeopardizing process stability and product quality.

Thus, according to a preferred embodiment the present invention relates to a continuous process for the production of a superabsorbent polymer comprising:

(a) providing an acidic liquid aqueous monomer mixture containing dissolved oxygen, whereby the monomers are selected to provide after polymerization a superabsorbent polymer, (b) continuously feeding said aqueous monomer mixture to a reactor, (c) introducing a source of carbonate or hydrogen carbonate into said aqueous monomer mixture prior to entry into the reactor thereby forming a gas phase comprising carbon dioxide and at least a part of said dissolved oxygen, said gas phase being dispersed in the aqueous monomer mixture, (d) subjecting the gas and aqueous monomer mixture to at least partial phase separation immediately prior to or after entry into the reactor and at least partially removing the separated second gas phase, (e) subjecting the liquid phase in the reactor to free-radical polymerization to obtain the superabsorbent polymer, (f) continuously removing the superabsorbent polymer from the reactor, (g) withdrawing at least one carbon dioxide containing off-gas stream from the reactor, (h) subjecting said carbon dioxide containing off-gas stream to scrubbing with a basic aqueous solution in a scrubber prior to venting thereby forming a carbonate or hydrogen carbonate containing aqueous scrubber solution, (i) drying the superabsorbent polymer, (j) grinding and classifying the dried superabsorbent polymer thereby removing fines having a particle size of less than 300 μm, (k) recycling said fines to the monomer mixture prior to the introduction of the source of carbonate or hydrogen carbonate, whereby at least a part of the carbonate or hydrogen carbonate containing aqueous scrubber solution obtained in (h) is introduced as source of carbonate or hydrogen carbonate in (c).

Preferably the carbon dioxide containing off-gas stream subjected to scrubbing comprises the gas stream removed from the reaction in step (d).

Furthermore, as explained above, the use of a source of carbonate or hydrogen carbonate for deoxygenation of the monomer mixture allows to considerably reduce the amount of additional inert gas used for deoxygenation of the monomer mixture or as inert gas stream in the reactor. In fact, both can be even totally omitted. Thus, with the process of the present invention premature polymerization and the related problems, like fouling and blocking of transfer lines, can be avoided while at the same time ensuring that the polymerization reaction is not adversely affected by inhibition or unwanted chain termination. This can be achieved without any additional complicated devices or the addition of further additives. Furthermore, thereby the amount of inert gas used in the process can be considerably reduced or even totally omitted thereby improving the economics of the entire process. Furthermore, according to the preferred embodiments described above process streams containing valuable product can be effectively recycled to the process without adversely affecting process stability or product quality which further improves the overall economics of the process.

The invention will now be illustrated in more detail with reference to the following examples.

EXAMPLES

The product parameters reported in the examples and tables are measured as follows:
CRC (Centrifuge Retention Capacity)
  EDANA, STANDARD TEST: WSP 241.2 (05).
  This test is incorporated herein by reference.
  Gravimetric Determination of Fluid Retention Capacity in Saline Solution after Centrifugation
AAP (AUP) Absorption Against Pressure (Absorption Under Pressure)
  EDANA, STANDARD TEST: WSP 242.2 (05).
  This test is incorporated herein by reference.
  Gravimetric Determination of Absorption Under Pressure
Extractables
  EDANA, STANDARD TEST: WSP 270.2 (05).
  This test is incorporated herein by reference.
  Determination of Extractable Polymer Content by Potentiometric Titration
Res. AA (Residual Acrylic Acid)
  EDANA, STANDARD TEST: WSP 210.2(04).
  This test is incorporated herein by reference.
  Determination of the Amount of Residual Monomers in Superabsorbent
  Materials—Polyacrylate Superabsorbent Powders
Oxygen in the Monomer Solution
  An electrochemical method is used for the determination of oxygen dissolved in the monomer solution.
Equipment and Material
  Microprocessor Oximeter Type Oxi 2000
  A membrane-covered electrochemical sensor having a gold cathode and a silver anode (WTW Trioxmatic 203)
  Calibration cell WTW PE/OXI OxiCal
  4-necked 250-ml glass vessel equipped with
  a magnetic stirring bar,
  a tight fitting for the sensor bar,
  a fitting for the nitrogen stream through the vessel,
  a fitting for the vent-gas stream and
  a fitting for charging the monomer solution.
  A magnetic stirrer
  A hose pump
  PE-hoses of suitable size and length
Procedure
  The calibration of the sensor is carried out in air saturated with water vapor using the Calibration cell WTW PE/OXI OxiCal. It was performed exactly as described in the user manual provided by WTW, the user manual incorporated herein by reference. To measure the oxygen concentration in the monomer solution the program was selected (PROG #6), which is suitable for the monomer solution and which was developed in cooperation with the supplier of the equipment.
Determination of the Oxygen Concentration in the Monomer Solution
  Prior to any measurement, the Microprocessor Oximeter is switched on and kept in the Stand by mode for proper polarization for at least 30 minutes as recommended by WTW
a) Determination on Lab Scale:
  The monomer solution to be measured is placed in a 250 ml glass reactor, which is equipped with a suitable opening carrying the membrane-covered sensor and a magnetic bar and is placed over a magnetic stirrer.
b) Determination on Production Scale:
  A magnetic stirrer was placed on the bottom plate of a stand near to the feed end of the monomer solution transfer line to the reactor and the 4-necked 250-ml glass vessel as described above was fixed on a stand on top of the stirrer. A PE-hose was inserted with one end into the transfer line after the point where the scrubber water is injected and sealed tightly. The other end of the hose is fixed to the hose pump and another hose connects the pump with the glass vessel. A nitrogen stream of 25 l/h is blown through the glass vessel for 10 minutes to provide an oxygen-free atmosphere in the vessel. Thereafter, monomer solution is pumped into the vessel and the nitrogen flow is maintained in order to simulate the conditions on the plant reactor.

In both cases (lab or plant sample), the calibrated sensor is fixed to the glass reactor respectively to the glass vessel with a angle of about 45° relative to the surface of the monomer solution and the stirrer is switched on and set to a speed to guarantee the needed approach flow to the sensor but to prevent the gas from the head-space of the vessel to form gas bubbles in the solution. After pressing the "PROG" button the oxygen concentration is measured and displayed in ppm (mg/l). The value is taken after it has stabilized, which may take some seconds.

In the presence of carbon dioxide, the buffering capability of the electrolyte solution is sufficient for short-term exposure; during long term exposure, however, carbon dioxide shifts the pH value into the acidic range and leads to increased values. For this reason, the sensor was entirely regenerated after each measurement according to the procedure given by WTW: The electrolyte solution of the sensor was exchanged, cathode and anode were cleaned and the membrane was exchanged for a new one.
Gel-Flow-Index (GFI)
  This method is used for the assessment of the flow behavior of superabsorbent gel as it is discharged from the reactor or the extruder. The flow characteristic is determined as the Gel Flow Index (GFI). It quantifies the flow of the gel granulate through a set of appropriate sieves, which are assembled to a sieve tower.
Equipment and Material
  Sieves having a diameter of 20 cm and mesh sizes of 25 mm, 20 mm, 16 mm, 10 mm and 8 mm A plastic tray (30 cm long, 25 cm wide, 5 cm high) to carry the sieve tower A 2-liter plastic bag A temperature-insulated box to take the sample in the bag during transport and short term storage and keep it at the desired temperature 500 ml plastic beaker Balance Procedure The sieves are stacked to form a sieve tower and placed in the plastic tray as shown in FIG. 1.

A gel sample taken from the source from which the sample needs to be analyzed is placed into the plastic bag, which is immediately put into the temperature-insulated box to be kept at the desired temperature until measured. From the sample in the plastic bag a portion of 200 g are carefully weighed into the plastic beaker and spread onto the top sieve of the sieve tower. Care must be taken not to touch or press the gel and not to allow any vibration to the sieves to not influence the natural, gravimetric flow behavior of the gel.

The gel sample is left for 2 minutes to flow through the sieves and thereafter, the portions of gel on the sieves are determined by weighing.

Calculation

The weights of the gel portions on the various sieves respectively in the tray are fed into the following formula to give the weighed mass on the sieve ($W_{i\ weighed}$)

$$W_{i\ weighed} = w_i * \alpha_i / w_{tot} * 100$$

where $w_i$ represents the weight of the gel on the sieve, $\alpha_i$ represents a sieve related weighting factor, where the factor is 0 for the 25-mm sieve, 0.2 for the 20 mm sieve, 0.4 for the 16-mm sieve, 0.6 for the 10-mm sieve, 0.8 for the 8-mm sieve and 1.0 for the gel weight in the tray and $w_{tot}$ represents the total gel weigh-in.

The Gel Flow Index is finally obtained by taking the sum of the weighted portions.

$$GFI = W_{i\ weighed}$$

For accuracy, the procedure is repeated and the GFI reported represents the average of two measurements.

Example 1

Deoxygenation in a 250 ml Glass Reactor, Reference Example

Monomer solution was prepared by mixing 86.67 g of 99.8% active acrylic, 60.55 g of 50% active NaOH, 77.7 g of water, 0.23 g of highly ethoxylated trimethylol propane triacrylate, having on average 15 EO-units in the molecule (HE-TMPTA) and 0.87 g of PEG 600. No fines were dispersed in it. The monomer solution was filled into a 250 ml glass reactor equipped with a magnetic stirring bar and a lid with three openings. One opening carried the membrane-covered electrochemical sensor which was inserted into the monomer solution for oxygen measurement. One opening was equipped with a gas one-way-valve and was used for gas release. Through the third valve were added under moderate agitation of the monomer solution 22.9 g of a 20% aqueous solution of sodium carbonate to bring the final degree of neutralization to a level of 70%. Immediately after the addition of the carbonate solution ($Na_2CO_3$) a vigorous reaction started releasing $CO_2$ in form of very fine gas bubbles. The oxygen concentration in the monomer solution dropped as described in Table 1 and stayed at the reduced level for at least 15 min. The addition of 0.05 g of a 35% active solution of $H_2O_2$, 1.3 g of a 10% active $Na_2S_2O_8$ and 0.34 g of a 1% active ascorbic acid solution initiated the polymerization immediately and heated the reaction mass within 3 min to a peak temperature of 115° C.

TABLE 1

| Time after carbonate addition (min) | Concentration of oxygen in the mix (ppm) |
|---|---|
| 0 | 4.3 |
| 1 | 0.1 |
| 5 | 0.1 |

Example 2

Reference Example

Example 1 was repeated except that 86.67 g of 99.8% active acrylic and 68.79 g of 49% active NaOH were used and that, instead of the carbonate solution, 34.67 g of the scrubber water were added. Due to the presence of carbonate in the scrubber water its contact with the prepared monomer solution showed the same reaction with $CO_2$-release as in the previous example. The oxygen concentration in the mixture dropped as shown in Table 2. Like in Example 1, the addition of 0.05 g of a 35% active solution of $H_2O_2$, 1.3 g of a 10% active $Na_2S_2O_8$ and 0.34 g of a 1% active ascorbic acid solution initiated the polymerization immediately and heated the reaction mass within 3 min to a peak temperature of 115° C.

TABLE 2

| Time after scrubber water addition (min) | Concentration of oxygen in the mix (ppm) |
|---|---|
| 0 | 4.3 |
| 1 | 0.2 |
| 5 | 0.2 |

Reference examples 1 and 2 are related to batch processes and therefore are not examples according to the present invention but show the effectiveness of using a source of carbonate or hydrogen carbonate for deoxygenation of the monomer mixture and the usefulness of the scrubber water as carbonate source. In both examples oxygen concentration as low as those reported in U.S. Pat. No. 4,656,232 using complicated puzzle arrangements is obtained.

Example 3

Comparative

A monomer solution was continuously produced feeding to the preparation unit of the monomer solution 2050.7 kg/h of a 99.8% active acrylic acid, 3322.8 kg/h of an 24% aqueous solution of sodium hydroxide to neutralize the acrylic acid to a degree of 70%, and 337.9 kg/h of water. Also continuously added were 3.8 kg/h of the 40.2% active Versenex 80 (Trademark of The Dow Chemical Company; 750 ppm b. o. AA), 14.8 kg/h of HE-TMPTA (7200 ppm b. o. AA) and 12.3 kg/h of PEG 600 (6000 ppm b. o. AA). This monomer solution having a temperature of 28° C. was continuously transferred from the monomer preparation unit to the two screw reactor (List ORP 4000) at a feed rate of 5742.3 kg/hour. The rotation speed of the kneading shaft was set to 4 of the cleaning shaft to 16 rpm. Into the feed stream was continuously injected 1.37 kg/h of a 30% active hydrogen peroxide solution (200 ppm b. o. AA), 69.7 kg/h (1700 ppm active b. o. AA) of a 5% active aqueous sodium persulfate solution, 245.7 kg/h of superabsorbent fines (9% b. o. AA) and a stream of about 13.5 kg/h of nitrogen. Through an inlet to the reactor, which is located next to the inlet for the monomer solution was also continuously added 30.76 kg/h of a 1% aqueous solution of ascorbic acid (150 ppm active b. o. AA). Furthermore, 70 kg/hour of steam were injected into the feed zone (zone 1; the zones of the reactor are described in WO 03/022896) of the reactor through a bottom value of the reactor and through a further inlet on top of the feed zone 410.1 kg/h of scrubber water (20% b. o. AA) were added. The reaction mixture ended up having a total solids content of 42% and due to the addition of the scrubber water a degree of neutralization of 72%.

The gas phase separated form the monomer solution in the head space of the reactor after entry, and the gas stream was directed to the vent system, passing the condenser and the vacuum system. For fast gas exchange in the head space, an additional nitrogen stream of 250 m$^3$/h was purged over the head space. The polymerization occurred in the reactor and the pressure in the reactor adjusted itself at 1075 mbar absolute, which is correlated to a peak temperature (as measured in the vapors in the Dome below the condenser) of about 96-98° C.

A sample of the monomer solution was taken at the feed point to the reactor under exclusion of air, and after gas phase separation, the $O_2$ concentration in the monomer solution was measured to be 2.7 ppm.

The evaporated water was condensed in the condenser above the reactor and refluxed onto the gel close to the discharge end in zone 3 of the reactor. The free flowing, granulated gel was continuously discharged from the reactor into the hold tank where it resided for about one hour at a temperature of about 95 to about 96° C., was minced through a die plate having 6 mm wide slits, which were circularly arranged, and dried for about 20 minutes on a belt dryer in an air stream having 190° C. in the first zone and 210° C. in the second zone of the dryer, about 10 minutes each.

After drying, the polymer was ground in a roll mill and sieved to obtain a particulate polymer having a particle size of between 150 and 850 µm.

During the production campaign the Scrubber (FIG. 2) was continuously operated. The scrubber, which is made from stainless steel, has a total volume of 60 m$^3$, of which 10 m$^3$/h are filed with a Propylene made packing. During operation, the scrubber was fed with about 260 m$^3$/h vent stream from the reactor, consisting essentially of nitrogen containing the volatiles from the monomer solution, 3000 m$^3$/h of drying air resulting form the belt dryers, which continuously dries the produced polymer gel, and 60 kg/h of water from the water ring pump of the vacuum system. From the bottom of the scrubber were continuously removed 410.1 kg/h of scrubber water to be charged to the reactor. The volume withdrawn was replaced by caustic and DI-water in such rates that on a molar base the liquid in the scrubber maintained the basicity (NaOH and carbonate), which corresponds the basicity of a 5% caustic. The scrubber liquid in the scrubber was continuously circulated at a rate of 50 m$^3$/h. The circulated stream was homogeneously distributed over the packing from where it trickled through the packing down to the bottoms, thereby generating an intimate mixing with the gas stream flowing upwards.

Example 4

Example 3 was repeated except that the scrubber water was continuously injected to the monomer solution in the transfer line and the injection of nitrogen into the transfer line was reduced to 8 kg/h. A sample of the monomer solution was taken at the feed point to the reactor and after gas phase separation the $O_2$ concentration in the monomer solution was measured to be 0.1 ppm.

Example 5

Example 4 was repeated except that the injection of nitrogen to the monomer solution in the transfer line and the additional sweep gas stream were completely omitted. A sample of the monomer solution was taken at the feed point to the reactor and after gas phase separation the $O_2$ concentration in the monomer solution was measured to be 0.3 ppm.

The results demonstrate the importance of proper deoxygenation for which the scrubber water is a preferred aid. Additional nitrogen for deoxygenation can be reduced or even be completely omitted. Product quality in terms of AAP and extractables is improved and the gel flowability (after extrusion), the GFI, is increased. Due to reduced stickiness the gel can form more even layers on the belt dryer resulting in more homogenous drying.

Example 6

Example 5 was repeated except that the additional nitrogen sweep stream over the head space of the reactor was set to be 100 m$^3$/h. A sample of the monomer solution was taken at the feed point to the reactor and after gas phase separation the $O_2$ concentration in the monomer solution was measured to be 0.2 ppm.

Example 7

Example 6 was repeated except that 40% of the condensate was separated after the condenser and fed into the scrubber to replace there the equal amount of process water. The HE-TMPTA concentration was reduced to 6700 ppm b. o. AA and the pressure in the reactor was also reduced to 960 mbar.

Withdrawal of condensate from the reactor system reduces the GFI slightly but does not negatively influence the product quality. Reduction of the pressure in the reactor to 960 mbar reduces the peak temperature to about 90-92° C. and contributes to quality improvement.

Example 8

Example 7 was repeated except that 100% of the condensate was separated after the condenser and fed into the scrubber to replace there the equal amount of process water. The polymer gel as extruded and fed to the dryer has a solids content of 49.7%.

Discharging 100% of the condensate from the reactor system and feeding it to the scrubber is also possible without loss of product quality. The gel flowability suffers to some extent, however, the gel can still efficiently be dried.

Example 9

Example 8 was repeated except that the sweep gas stream was stopped and the pressure in the reactor further reduced to 750 mbar. This controlled the peak temperature at about 85° C.

Once more it was demonstrated that peak temperature control is an essential measure for obtaining good product performance. Vacuum in the reactor is also helpful for improved deoxygenation of the monomer solution and accelerates the removal of oxygen in the head space of the reactor.

TABLE 3

| Example | CRC (g/g) | AAP (07 psi)(g/g) | Extractables (%) | Res. AA (ppm) | GFI (after extrusion) |
|---|---|---|---|---|---|
| 3 | 35.7 | 9.3 | 20.9 | 323 | 45.7 |
| 4 | 34.6 | 11.2 | 18.8 | 266 | 50.9 |
| 5 | 33.0 | 11.6 | 18.8 | 310 | 44.5 |
| 6 | 34.3 | 12.7 | 18.1 | 287 | 49.3 |
| 7 | 32.9 | 14.4 | 16.6 | 350 | 46.9 |
| 8 | 33.1 | 15.8 | 16.4 | 249 | 43.5 |
| 9 | 31.6 | 18.4 | 14.6 | 301 | nm |

The invention claimed is:

1. A continuous process for the production of a superabsorbent polymer comprising:
    (a) providing an acidic liquid aqueous monomer mixture containing dissolved oxygen, whereby the monomers are selected to provide after polymerization a superabsorbent polymer whereby the aqueous monomer mixture comprises at least one ethylenically unsaturated acid and at least one monomer bearing at least two ethylenically unsaturated groups and whereby the at least one ethylenically unsaturated acid is at least partially neutralized,
    (b) continuously feeding said aqueous monomer mixture to a reactor,
    (c) introducing a source of carbonate or hydrogen carbonate into said aqueous monomer mixture prior to entry into the reactor thereby forming a gas phase comprising carbon dioxide and at least a part of said dissolved oxygen, said gas phase being dispersed in said aqueous monomer mixture whereby the source of carbonate or hydrogen carbonate is introduced in an amount to result in from about 1 to about 15% of the total neutralization of the acidic functionality of the resultant superabsorbent polymer to achieve the respective degree of neutralization of the resultant superabsorbent polymer,
    (d) subjecting said gas and aqueous monomer mixture to at least partial phase separation creating a second gas phase comprising the resulting product of oxygen and carbonate or hydrogen carbonate and a liquid phase immediately prior to or after entry into the reactor and at least partially removing the separated second gas phase,
    (e) subjecting the liquid phase in the reactor to free-radical polymerization to obtain the superabsorbent polymer, and
    (f) continuously removing the superabsorbent polymer from the reactor.

2. The process of claim 1, whereby the aqueous monomer mixture is fed to the reactor via a transfer line and wherein the pressure difference between said transfer line and reactor is from about 0.5 to about 5 bar.

3. The process according to claim 1, whereby the free-radical polymerization is initiated by a redox initiator and wherein the oxidative component of the redox initiator is added to the monomer mixture in step (a) and the reductive component of the redox initiator is added to the monomer mixture after step (c) prior to the monomer mixture entry into the reactor or the reductive component of the redox initiator is added directly to the reactor at a position in proximity to the entry point of the monomer mixture.

4. The process according to claim 1, whereby the reactor encompasses at least three zones, wherein the first zone is an initiation zone, the second zone is a gel-phase zone and the third zone is a granulation zone and the monomer mixture is fed to the initiation zone.

5. The process according to claim 1, whereby the reactor is selected from continuous kneaders and extruders or belt reactors.

6. The process according to claim 1, whereby no additional inert gas is introduced in either of steps (a), (b), and (c) or no additional inert gas is introduced into the reactor or no additional inert gas is introduced at any point of the process.

7. The process according to claim 1, whereby fines of a superabsorbent polymer having a particle size of less than about 300 μm are added to the aqueous monomer mixture prior to the introduction of the source of carbonate or hydrogen carbonate.

8. The process according to claim 1, whereby at least one carbon dioxide containing off-gas stream withdrawn from the reactor is subjected to scrubbing with a basic aqueous solution in a scrubber prior to venting thereby forming a carbonate or hydrogen carbonate containing aqueous scrubber solution.

9. The process according to claim 1, whereby said source of carbonate or hydrogen carbonate comprises an aqueous solution of any one of an alkali metal carbonate, hydrogen carbonate, or mixtures thereof.

10. The process according to claim 8, wherein said source of carbonate or hydrogen carbonate further comprises said aqueous scrubber solution of any one of an alkali metal carbonate, hydrogen carbonate, or mixtures thereof.

11. The process of claim 8, whereby the source of carbonate or hydrogen carbonate is at least a part of said carbonate or hydrogen carbonate containing aqueous scrubber solution.

12. The process according to claim 1, further comprising:
    (g) withdrawing at least one carbon dioxide containing off-gas stream from the reactor,
    (h) subjecting said carbon dioxide containing off-gas stream to scrubbing with a basic aqueous solution in a scrubber prior to venting thereby forming a carbonate or hydrogen carbonate containing aqueous scrubber solution,
    (i) drying the superabsorbent polymer,
    (j) grinding and classifying the dried superabsorbent polymer thereby removing fines having a particle size of less than about 300 μm,
    (k) recycling said fines to the monomer mixture prior to the introduction of the source of carbonate or hydrogen carbonate, whereby
    at least a part of the carbonate or hydrogen carbonate containing aqueous scrubber solution obtained in (h) is introduced as source of carbonate or hydrogen carbonate in (c).

13. The process according to claim 1, wherein the resultant superabsorbent polymer is surface modified by surface post-crosslinking, heat-treatment, by additives, or any combination thereof.

14. A superabsorbent polymer comprising the superabsorbent polymer made by the process of claim 1.

15. A superabsorbent polymer comprising the superabsorbent polymer made by the process of claim 12.

* * * * *